US007916744B2

(12) United States Patent
Walston

(10) Patent No.: US 7,916,744 B2
(45) Date of Patent: Mar. 29, 2011

(54) METHOD AND SYSTEM FOR SCANNING FOR A DOWNSTREAM CHANNEL IN A COMMUNICATION NETWORK

(75) Inventor: Allen Walston, Sandy Springs, GA (US)

(73) Assignee: ARRIS Group, Inc., Suwanee, GA (US)

( * ) Notice: Subject to any disclaimer, the term of this patent is extended or adjusted under 35 U.S.C. 154(b) by 422 days.

(21) Appl. No.: 11/756,544

(22) Filed: May 31, 2007

(65) Prior Publication Data

US 2007/0294739 A1 Dec. 20, 2007

Related U.S. Application Data

(60) Provisional application No. 60/809,646, filed on May 31, 2006.

(51) Int. Cl.
*H04J 3/06* (2006.01)
*H04L 12/28* (2006.01)
*H04N 7/173* (2006.01)
(52) U.S. Cl. ......................... 370/431; 370/503; 725/117
(58) Field of Classification Search ........................ None
See application file for complete search history.

(56) References Cited

U.S. PATENT DOCUMENTS

| 2002/0083465 A1* | 6/2002 | Van Beek ...................... 725/119 |
| 2002/0157106 A1* | 10/2002 | Uskali et al. .................. 725/107 |
| 2005/0075125 A1* | 4/2005 | Bada et al. .................... 455/525 |
| 2006/0225109 A1* | 10/2006 | Seo ............................... 725/100 |
| 2007/0287377 A1* | 12/2007 | Eck .............................. 455/3.02 |

* cited by examiner

*Primary Examiner* — Chirag G Shah
*Assistant Examiner* — Srinivasa R Reddivalam
(74) *Attorney, Agent, or Firm* — Troy A. Van Aacken; Robert J. Starr

(57) ABSTRACT

A predetermined current frequency is selected for a cable modem or embedded media terminal adapter to evaluate for presence of a CMTS signal. A determination is made whether the current frequency carries signal energy as opposed to just noise. If no signal energy is detected, the current frequency is changed by ½ of a channel width to a new frequency, which becomes the current frequency, and the determination is re-performed. If the determination of the current frequency indicates that signal energy is present, but not CMTS energy, then a new frequency indicates that selected that differs from the current frequency by 1 MHz. If the determination at the current frequency indicates that CMTS signal energy is present, but QAM lock cannot be achieved, then a new frequency is selected by changing from the current frequency by a full channel width.

11 Claims, 1 Drawing Sheet

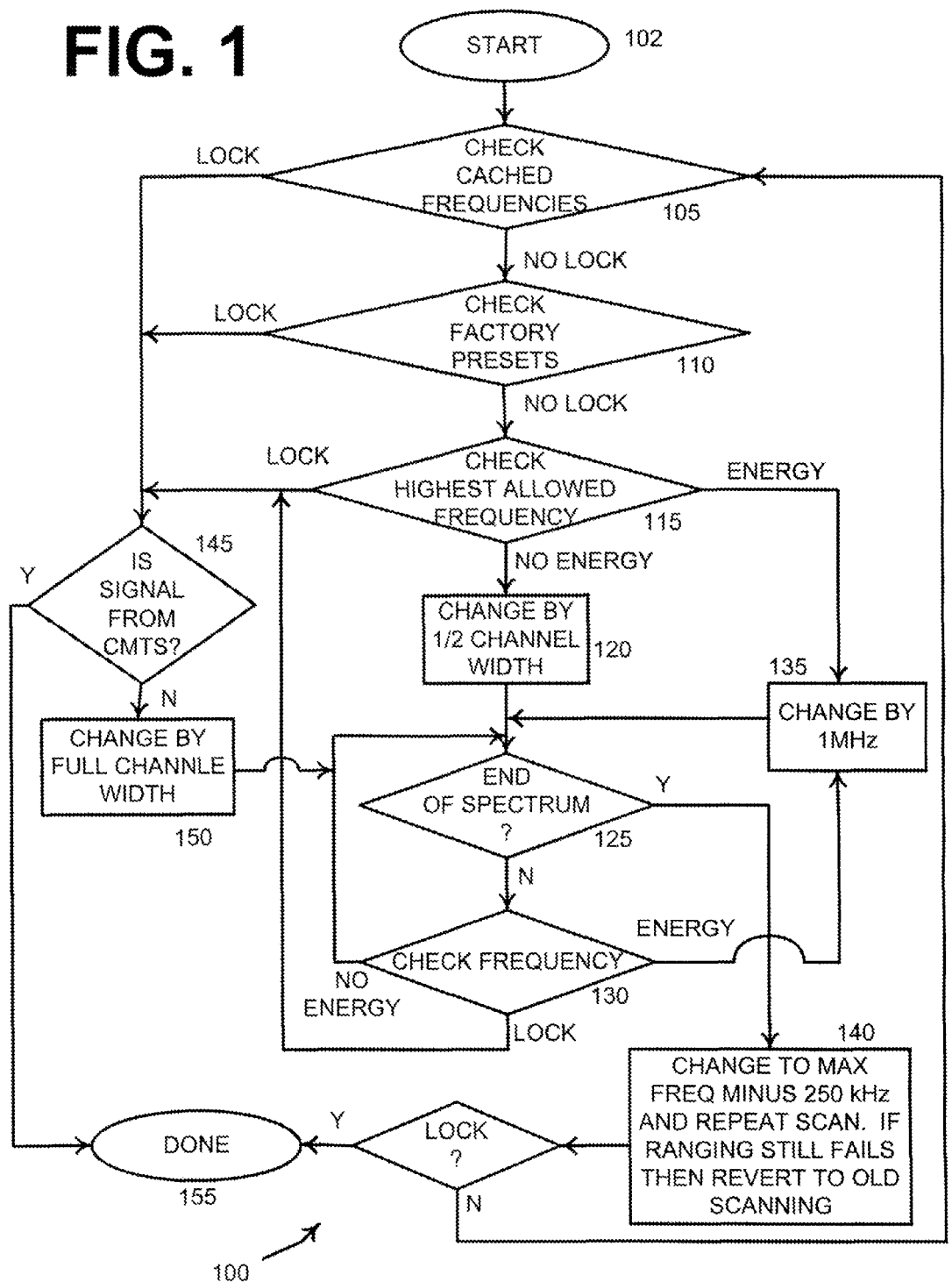

METHOD AND SYSTEM FOR SCANNING FOR A DOWNSTREAM CHANNEL IN A COMMUNICATION NETWORK

CROSS REFERENCE TO RELATED APPLICATION

This application claims the benefit of priority under 35 U.S.C. 119(e) to the filing date of Walston, et al., U.S. provisional patent application No. 60/809,646 entitled "Enhanced EuroDOCSIS Scanning," which was filed May 31, 2006, and is incorporated herein by reference in its entirety.

FIELD OF THE INVENTION

The invention relates, generally, to communication networks and, more particularly, to reducing installation time in cable modems.

BACKGROUND

Currently, broadband networks may be used to provide traditional telephony service over community antenna television ("CATV") or other communications networks using coaxial cable ("coax") or optical fiber cable. For example, ARRIS Group, Inc. offers telephony over cable products known as VOICE PORT® and TOUCHSTONE® cable modems which interface a media terminal adaptor ("MTA"), or an embedded media terminal adaptor ("EMTA"), with a data network. When a customer orders new data or telephony service from a Multiple System Operator ("MSO"), an installer generally travels to the customer's home with a new cable modem or EMTA. Alternatively, the end user could purchase the modem and install it him/herself. In either case, it is desirable for the modem to complete installation as quickly as possible.

One of the most time consuming parts of the installation process can be the modem's establishing communications with the centrally located remote device, typically a cable modem termination system ("CMTS"). To establish communications, the cable modem first checks, or scans, a number of different radio frequency ("RF") channel frequencies looking for a downstream signal from the CMTS. In order to allow a cable system operator's installers to perform multiple installations in a day, or to improve customer satisfaction in the case of a self-installation, it is desirable to minimize the time required for channel frequency scanning.

Therefore, there is a need in the art for a method and system for reducing the time required for a newly installed modem to complete its downstream signal search.

SUMMARY

It is an object to provide a method and system for reducing the time required for a cable modem ("CM") to identify the downstream frequency of a signal from a cable modem termination system ("CMTS") network. The CM scans a series of frequencies and for each one determines whether a CMTS signal is present or not, or whether another RF energy source, such as analog or digital video, is present. In every case where a downstream CMTS signal is not present, it is desirable for the cable modem to quickly change the next logical frequency in the series of frequencies as it continues to search for a CMTS downstream signal. The CM accomplishes the goal of scanning for downstream frequencies by checking whether signal energy, as opposed to noise or other energy, is present, determining whether it can get signal lock to the signal energy, and then applying an efficient method of deciding what frequency to check next.

BRIEF DESCRIPTION OF DRAWINGS

FIG. 1 illustrates a floe diagram of a method for scanning for downstream frequencies in a communication device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variation, modifications and equivalent arrangements, the present invention being limited only by the claims appended hereto and the equivalents thereof.

Turning now to the figures, FIG. 1 illustrates a flow diagram of a method 100 for a CM/MTA/EMTA ("end user device") to scan for a downstream channel to which to lock. After starting at step 102, each of a list of frequencies that have been cached in a memory at the end user device are checked at step 105 to determine whether energy at the frequency being checked is present at a downstream input port of the end user device. If no energy is detected at the frequencies being evaluated at step 105, the end user device does not lock to a frequency and method 100 advances to step 110. At step 110, factory presets stored into the end user device at the time of manufacture are checked to determine whether energy at the frequency being checked is present at the downstream input port of the end user device. If RF downstream channel energy is not detected at any of the frequencies stored into the factory presets at step 110, method 100 advances to step 115.

At step 115, method 100 causes the end user device to begin scanning at a predetermined highest allowed frequency. It will be appreciated that at step 115, scanning can begin at a lowest predetermined frequency. The frequency being scanned is referred to as the current frequency. If RF channel energy is not detected at step 115, method 100 advances to step 120 where the scan frequency is decremented to a new frequency (or incremented to a new frequency is if the start frequency at step 115 was the predetermined lowest allowable frequency). The scan frequencies are preferably round/whole number frequencies, e.g. 741000000 hertz. The change in frequency at step 120 is preferably in increments that are one half the width of a television channel if no signal energy was detected at step 115. It will be appreciated that in general a TV channel width is 6 MHz on cable plants that use North American standards, and 8 MHz on cable plants that use European standards.

If the end user device detects energy at step 115 on the current frequency but is unable to achieve quadrature amplitude modulation ("QAM") lock at the current frequency, the modem changes by 1 MHz to a new frequency at step 135 and retries. This newly tuned new frequency becomes the current frequency. If the end user device achieves QAM lock at step 115, but does not detect expected messaging that would be present on a signal from a CMTS, then the end user device determines that the detected energy is from a digital video, multimedia, or similar, signal and changes frequency by 1 full channel width and retries to detect a CMTS signal at step 150. If the end user device unsuccessfully attempts to detect energy at a given frequency, method 100 returns to step 120 and resumes changing frequencies in ½ channel width jumps.

Method 100 provides a safe and effective process for detecting a downstream CMTS signal. The end user device checks ½ channel widths, because if there is no energy present at its current frequency then the current frequency the device is attempting to detect is likely at least ½ channel width away from the center frequency of a carrier. If the device detects energy, it checks every 1 MHz because most CATV plants use signals that are centered on frequencies that are multiples of 1 MHz. If an end user device achieves QAM lock to a signal that is not from a CMTS, it knows that the current QAM channel extends for another ½ channel width and any subsequent CMTS signal must be centered at least ½ channel width beyond that. Therefore each of the scanning steps provides good coverage while allowing the modem to scan quickly through the RF spectrum.

If an end user device fails to lock to a CMTS on a given frequency, it checks to see if that frequency is the lowest one that is allowed on the cable plant at step 125 (or, if the start frequency was the lowest frequency allowable at step 115, then the device determines whether the frequency is the highest allowable at step 125. If it is not the lowest (or highest) frequency the end user device will continue scanning at step 130. If it is the lowest frequency (or highest) then the modem will restart its scanning 250 kHz below the highest allowed frequency (or above the lowest) and scan again at step 140. By offsetting its starting frequency by 250 kHz the end user device will check only frequencies that were not checked during its initial scanning. During this second pass through the spectrum the modem will jump full channel widths. If it detects energy but no lock on a frequency then it will check all previously-unchecked frequencies in 250 kHz increments from ½ channel width above the current frequency to ½ channel width below it. If it succeeds in locking on one of these frequencies it will either range (in the case of a CMTS) or jump by 1 channel width (in the case of QAM lock to a non-CMTS signal). If the modem again comes to minimum allowed frequency it will perform an older scanning procedure that does an exhaustive search of all possible frequencies. If this exhaustive search still fails then the modem will start the entire process over again. If at any point the modem determines that it has locked to a CMTS downstream signal it will exit the scanning process (155) and attempt to establish two way communications.

What is claimed is:

1. A computer-implemented method for reducing frequency scanning time in one or more of a plurality of remote network devices connected to a central network device comprising:

receiving at a receiver a signal associated with a current downstream frequency;

determining the signal energy content of the current downstream frequency at an end user device;

identifying a signal associated with a new downstream frequency at the end user device the new downstream frequency differing from the current downstream frequency by a half channel width, and the new downstream frequency being identified based on the determination of signal energy content in the current downstream frequency is zero;

repeating the method at the end user device upon identifying a signal associated with a new downstream frequency;

in response to identifying energy in the signal at the current downstream frequency, attempting QAM lock on the signal at the current downstream frequency;

determining that the signal at the current downstream frequency is not that of a headend device responsive to attempting QAM lock;

if the signal at the current downstream frequency is not that of a headend device, identifying a new downstream frequency at the end user device, wherein the new downstream frequency at the end user device that differs from the current frequency by a full channel width; and wherein scanning is restarted with an offset of 250 kHz from the original scanning after scanning a predetermined spectrum of frequencies without achieving lock to a CMTS signal.

2. The method of claim 1 further wherein the current downstream frequency is the new downstream frequency of a previous iteration of the method.

3. The method of claim 1 wherein the new frequency received by the one or more of the plurality of remote network devices differs from the current frequency by 1 MHz if the determination of signal energy content indicates that the current downstream frequency carries signal energy to which the remote network device cannot achieve QAM lock.

4. The method of claim 1 wherein the channel width is 6 MHz.

5. The method of claim 1 wherein the channel width is 8 MHz.

6. The method in claim 1 wherein a given frequency is not checked if it was evaluated in a previous pass through the spectrum.

7. A computer implemented method, comprising:

selecting a new frequency to scan in an end user device;

tuning a receiver to the identified frequency;

measuring an energy level associated with the selected frequency at the end user device;

comparing the measured energy level associated with the identified frequency at the end user device to an expected energy level associated with a downstream channel;

attempting to lock onto the downstream channel at the end user device if the measured energy level associated with the selected frequency meets an expected energy level;

repeating the method if the measured energy level does not meet the expected energy level or if the attempt to lock onto the downstream channel is unsuccessful, wherein selecting a new frequency is a half-channel width from a previous frequency;

wherein if the attempt to lock onto the downstream channel at the identified frequency is successful, but the signal is not originated by a headend device, repeating the method by selecting a new frequency that is a full channel width from a previous frequency; and wherein scanning is restarted with an offset of 250 kHz from the original scanning after scanning a predetermined spectrum of frequencies without achieving lock to a CMTS signal.

8. The computer implemented method of claim 7, further comprising:

selecting a cached frequency from a frequency cache at the end user device;

attempting to lock onto the selected cached frequency using the end user device;

repeating the selection of a cached frequency and attempt to lock onto the selected cached frequency until lock is successful or cached frequencies are exhausted.

9. The computer implemented method of claim 7, wherein if the measured energy is below the expected energy level but there is energy at the selected frequency, the step of selecting a frequency to scan in the end user device comprises changing a previously selected frequency by 1 MHz.

10. The computer implemented method of claim 8, wherein if the measured energy is below the expected energy level and there is no energy at the selected frequency, the step of selecting a frequency to scan in the end user device comprises changing a previously selected frequency by half a channel width.

11. The computer implemented method of claim 7, further comprising:
   determining if any more frequencies within a frequency spectrum are left to scan;
   performing a second scanning of the spectrum of frequencies;
   if no channels are found on the second scanning of the spectrum of frequencies, revert to legacy frequency scanning methods.

* * * * *